July 18, 1961 C. C. GEORGIAN ET AL 2,993,029
CONSERVING DIHYDRIC ALCOHOL IN THE PREPARATION OF POLYESTERS
Filed Oct. 3, 1958
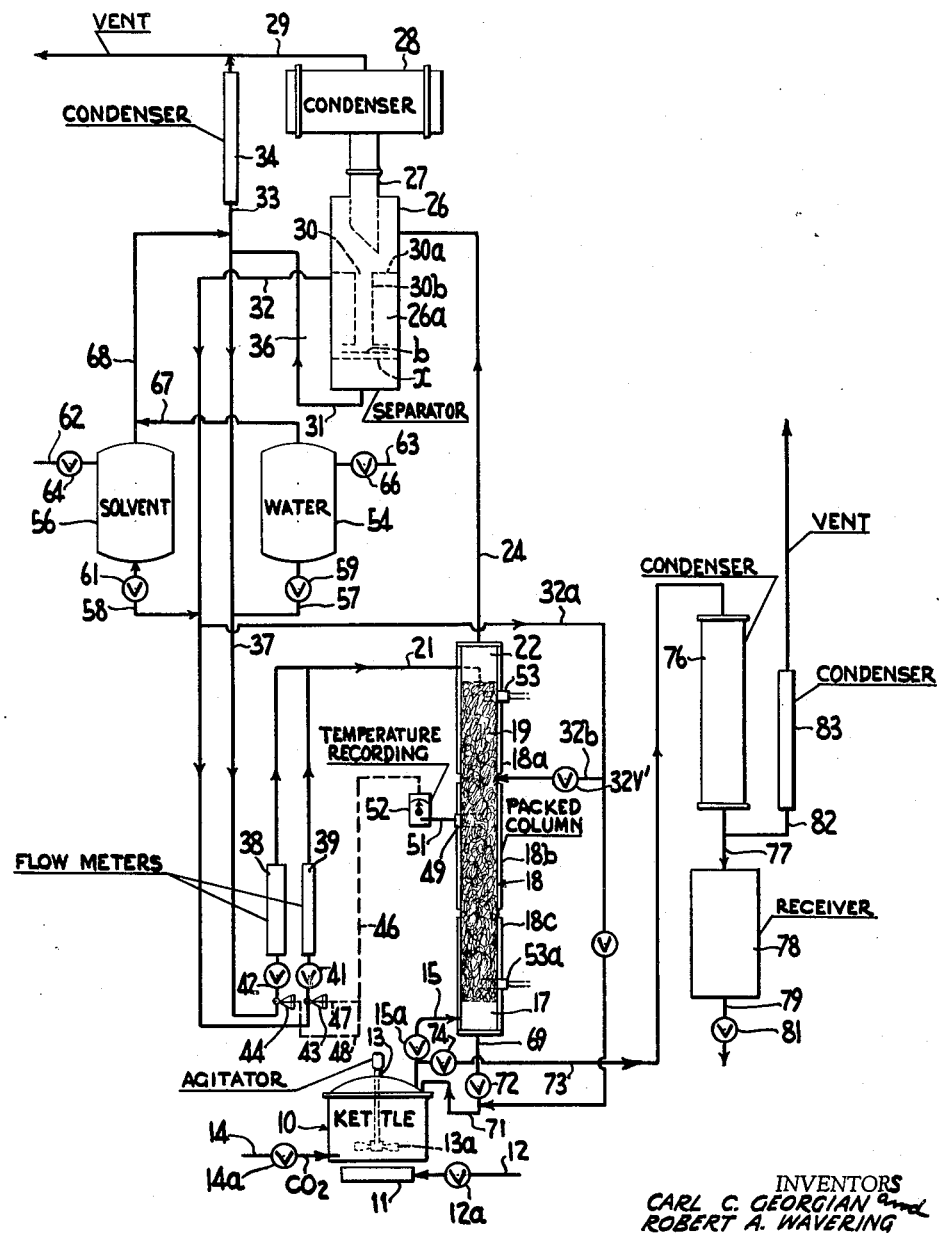
INVENTORS
CARL C. GEORGIAN and
ROBERT A. WAVERING
BY
ATTORNEY

United States Patent Office 2,993,029
Patented July 18, 1961

2,993,029
CONSERVING DIHYDRIC ALCOHOL IN THE PREPARATION OF POLYESTERS
Carl C. Georgian, La Marque, Tex., and Robert A. Wavering, Gibsonia, Pa., assignors to Pittsburgh Plate Glass Company, Allegheny County, Pa.
Filed Oct. 3, 1958, Ser. No. 765,205
4 Claims. (Cl. 260—75)

This invention relates to the preparation of non-thermosetting polyesters of dihydric alcohols and essentially saturated polybasic acids and it has particular relation to a method of and apparatus for preparing such polyesters, in which evaporational losses of the dihydric alcohol component are substantially eliminated or greatly reduced.

In the preparation of non-thermosetting polyesters of dihydric alcohols and dibasic acids (or anhydrides thereof) which are free of alpha-beta ethylenic unsaturation, the dihydric alcohol or a mixture of dihydric alcohols and a dibasic acid or a mixture of dibasic acids are heated to a relatively high temperature whereby to effect esterification reaction with accompanying evolution and evaporation of water. Usually, there is also included a non-reactive medium, of low solubility in water; e.g., an aromatic hydrocarbon such as xylene, or toluene, or other medium designed to distill as a constant boiling mixture with the water of reaction and thus to promote removal of the latter from the system. The vapor mixture is removed from the reaction zone, and condensed and the liquid components are separated from each other by decantation. The aqueous fraction is discarded and the medium is returned to the reaction zone.

It has been observed that in the operation of such system, the dihydric alcohol component of the esterifiable mixture is characterized by a substantial tendency to distill over with the water and the aromatic hydrocarbon so that a substantial percentage of it is lost through the separation of the water from the refluxing medium. In this way, large amounts of the dihydric alcohol component (as much as 10 or 15 percent by weight) were often lost from the system. If a satisfactory acid number, stability, curing rate and other properties were to be attained in the polyester, and if the properties of the ultimate interpolymer were to be maintained at a satisfactory level, it was often necessary to employ excesses, beyond that actually reacted with dicarboxylic acid, of dihydric alcohol to compensate for these losses. Also the rate of reaction was often relatively low. These effects were most pronounced in those instances in which a relatively volatile dihydric alcohol such as propylene glycol was employed.

In our copending application, Serial Number 418,140, filed March 23, 1954, it is disclosed to react glycols, such as propylene glycol, with an anhydride of alpha-beta ethylenic dicarboxylic acids, such as maleic anhydride, preferably in the presence of some anhydride of a non-ethylenic, dicarboxylic acid such as phthalic anhydride, to form a thermosetting polyester. Features of this prior invention reside in the fact that the reaction is conducted under a column which is supplied with a reflux of water, usually mixed with added reflux medium such as xylene, which is adapted to form an azeotrope with the water evolved in the reaction. In the process of this prior application, the hydroxyl content of the ester was kept as low as practicable. This necessitated the use of the glycol in very nearly stoichiometric ratio, only such excesses of the glycol being employed as were required to obtain a low acid value in a short time. The processes as disclosed in this prior application usually required cooking only to relatively high acid numbers, e.g. 40 or 50, which did not require extremely prolonged, or high-temperature cooking. The resultant polyester molecules terminated chiefly in carboxyls.

This invention comprises a method of an apparatus for reducing losses or dihydric alcohol in forming polyesters which are of the non-thermosetting type and in certain of its aspects, it comprises introducing into a closed vessel a mixture of a dihydric alcohol and one or more polybasic acids, which are free of ethylenic unsaturation and which usually do not form anhydrides. Very often, great excesses over molar equivalencies of the polyol with respect to the dicarboxylic acid are used. For example, the proportion of total hydroxyls to carboxyls may exceed by about 5 to about 80 percent stoichiometric equivalency. These proportions are designed to give the polyester products high hydroxyl values, e.g. about 50 to 500 with hydroxyls terminating the molecules and adapting them for use in forming polyurethane foams and films. These proportions of the polyol tend to complicate the problem of preventing polyol losses in the water vapors from the kettle because much free polyol remains in the system until the reaction is far advanced. Also, the polyester is cooked to a very low acid number, e.g. about 1 to 3 which requires intensive and prolonged cooking that tends to increase polyol losses.

It is now found that even in such system, the loss of polyol can be controlled and products of high uniformity and other desirable properties can be obtained by mixing the polyol component with the non-reactive diluent which forms a constant boiling mixture with water, but does not form ternary vapor mixtures with the polyol and water. In further pursuance of the invention, the vapor mixture from the reaction kettle is passed into a column providing a vapor zone which is maintained at a graduated temperature, the bottom being relatively hot, and the exit end being at a lower temperature, namely, at a temperature near the boiling point of the binary, constant boiling mixture passing from the column. The vapors in the top of the column are washed with water, or a mixture of water and said non-reactive diluent. By thus contacting the vapor mixture with water, the loss of the water-soluble polyhydric alcohol component from the system is greatly reduced. Usually, the time for esterification can be shortened and concomitantly, the acid value and stability of the polyester product are as good as, or even better than those of materials containing polyesters prepared in conventional manner without attempt to prevent glycol loss.

As a still further feature, the invention comprises maintaining an intermediate portion of the column at a temperature so selected as to obtain a high degree of stability in the operation of the system.

Appropriate dicarboxylic acids for use in the preparation of the polyesters of this invention comprise those acids which are free of ethylenic unsaturation, and other unsaturation other than benzenoid unsaturation, and which react with dihydric alcohols to give thermoplastic, or non-heat convertible resins. These acids comprise:

Such aromatic acids containing benzenoid rings as:

TABLE A

Phthalic acid
Terephthalic acid
Isophthalic acid and homologs obtained by replacement of nuclear hydrogen by one or more chlorine atoms or by methyl or methyl groups.

Other saturated dicarboxylic acids are of the aliphatic type and comprise:

TABLE B

Oxalic acid
Glutaric acid
Adipic acid
Azelaic acid
Sebacic acid
Malonic acid
Succinic acid
Isosebacic acid
Suberic acid
Decanedioic acid Mixtures of acids from Tables A and B are contemplated.

The dihydric alcohols or glycols employed in the process of the present invention in the preparation of long chain polyesters which are of the non-heat convertible type are represented by those glycols which preferably have boiling points below about 280° C. and which contain from 2 to about 10 carbon atoms in the chain. Some of the glycols contemplated include 1 or more ether linkages between hydrocarbon groups.

Examples of glycols of this class are represented by:

TABLE C

Ethylene glycol
Propylene glycol
Diethylene glycol
Dipropylene glycol
Butanediol 1,3
Triethylene glycol
Trimethylene glycol
1-4 butanediol
1-4 pentanediol
2,2 dimethyl 1,3 propanediol
2,3 butanediol Some triol or higher polyol may also be employed. Examples of these are:

TABLE D

Trimethylol ethane
Trimethylol propane
Glycerol
Pentaerythritol
1,2,6-hexanetriol and others.

Xylene or toluene are usually preferred as a reaction media. These media with water give constant boiling temperatures below the boiling point of either. Other non-reactive liquid diluents which with water give constant boiling points may be used. Needless to say, the vapors at the constant boiling temperature are of constant composition. Examples of such other media include benzene, ethyl benzene, aromatic petroleum naphthas and other liquid media which with the water of reaction, will give a constant boiling point in the top of the column, at a temperature which preferably is below the boiling point of the mixture of the medium and the dihydric alcohol component and usually is in a range of about 198° F. to 210° F. The medium should also be so selected as to obviate the formation of a ternary vapor mixture of dihydric alcohol, water and solvent medium at the top of the column. An appropriate solvent medium may also be described as being an organic distilling medium which is relatively insoluble in water but which possesses the property of giving with water a constant boiling point and mixtures of which with water vapors, upon condensation, separate into an essentially aqueous fraction and an essentially non-aqueous fraction. For different media some change in the temperature of the coolant mixture in the top of the column may be required.

It is considered that for smooth operation, the mixture of solvent vapors and water vapor, passing out of the top of the column should be approximately in ratio giving constant boiling temperature. To attain such mixture, water is the component most usually required to be made up in the top of the column. However, if not enough solvent vapors are present to give such ratio, solvent can be added to provide the same. Concurrently with the maintenance of desired proportions in the vapors from the column, the total amount of water and/or solvent return to the top of the column should be such as to maintain desired temperature range.

The mid portion of the column is usually maintained at a temperature of about 215° F. to about 260° F. or at such temperature as will volatilize water passing downward and return it to the top of the column. The temperature may be sufficiently low to allow any liquid xylene in the mid portion to return downwardly toward the kettle.

The bottom portion of the column near the kettle is usually at a temperature definitely below that of the top of the kettle. If a solvent such as xylene is to be returned to the kettle, said portion preferably is somewhat below the boiling point thereof. This temperature may be in a range of about 220° F. to about 400° F., dependent upon the solvent employed. In the instance of xylene, temperature is 280° F. and in the instance of toluene is 226° F.

The solvent medium need not be employed in large amount, since its vapors are condensed, separated from the water and the liquid is returned to the reaction repeatedly. Enough should be present in the kettle to assure available liquid in the kettle to maintain with water of reaction, a constant boiling ratio in the top of the column. The amount should not be so great as to produce flooding of the column by its ebulition. A percentage of about 1 to 25 percent, based upon the charge, is suggested.

Catalysts of esterification, such as p-toluene sulfonic acid in conventional amounts, e.g. about 1 percent may be added to the reaction mixture, but usually are not required.

The reaction, or kettle temperature is normally about that of esterification reaction. During the early stages of reaction its upper limit is maintained automatically and heat is applied as fast as is practicable. A part of the heat during the early stages, may be exothermal. As the reaction progresses, the kettle temperature tends to rise but is not permitted to go so high as to produce charring of the reactants. It will not go much above about 280° C. (536° F.) and usually does not go above about 260° C. (500° F.).

Time of reaction is determined by checks of the acidity and/or the viscosity of the charge in the kettle. Usually, it will fall in a range to about 8 to about 30 hours. The final acid number for polyesters used in the polyurethane resin field is usually below 10 and preferably is in a range of 1 to 3 or even lower.

The reaction usually involves three more or less well defined stages:

(A) The initial stage in which water is evolved in large amounts and the temperature in the kettle rises.

(B) The intermediate stage in which water comes off only slowly and the temperature is maintained at near the maximum until the desired acid number is reached. During this stage a relatively heavy reflux of water or water and medium to the top of the column may be maintained.

(C) The final stage in which the polyester still hot and fluid is blown with inert gas, such as combustion gas, to strip off the solvent medium and traces of water and other volatile matter and to bring the viscosity to desired range. During all or the final portion of this stage, reflux may be discontinued.

For a better understanding of the invention, reference may now be had to the accompanying drawing in which the single figure illustrates diagrammatically an appropriate embodiment of apparatus for use in the practice of the invention.

It will be appreciated that such pumps for promoting flow of fluids and such other devices as are required by local conditions, or by engineering practice may be added, and are omitted from the drawing as being obvious.

The apparatus as shown in the drawing, comprises an appropriate reaction vessel such as a closed kettle 10 which is heated by a convenient instrumentality, such as a gas burner 11, supplied with fuel through a line 12, having a valve 12a, by means of which the supply of fuel may be regulated to obtain any desired temperature in the reaction mixture. Naturally, any other convenient heating instrumentality may be employed and may, for example, comprise electrical heating coils, or heat interchange means for circulating a heated fluid medium; e.g., heating jackets, or tubular coils in the kettle whereby the charge may be heated.

The kettle should also be provided with a temperature determining device, such as a thermometer or a thermocouple (not shown) an agitator 13, with blades 13a and a source of supply (such as a line 14 having valve 14a) of inert gas such as carbon dioxide, or combustion gases, for blowing the polyester product. Preferably, the inlet of gas is disposed just below the blades of agitator 13 in order to assure thorough contact of the charge and the gas.

Vapor mixture comprising solvent, water of reaction and small amounts of the dihydric component of the reaction mixture are conducted from the top of the kettle 10 through a line 15 provided with a valve 15a and are discharged into the lower portion 17 of a column 18. The latter, preferably, is provided with a suitable packing or with conventional bubble plates. For purposes of illustration, a foraminous packing 19 of Berl saddles, Raschig rings, or the like is shown.

Column 18 may be provided with jacket sections 18a, 18b and 18c, through which a fluid medium such as steam or a liquid, may be circulated to assist in attaining desired temperature gradient in the column. Suitable lines (not shown) may be employed to maintain circulation of fluid to the jacket sections. In many instances, the use of the jacket sections is not required. This is especially true if xylene or other medium designed to form a low boiling mixture with water is returned to the top of the column. The mixture of vapors in the top of the column is washed by a liquid medium, at least a part of which is water; and some of it may also be added solvent medium such as xylene, immiscible with, or but partly miscible with the water. This medium, in the form of a spray, may be introduced into the column through the inlet line indicated at 21. The conditions of operation of the column will be more fully elaborated upon hereinafter.

Vapors of xylene or other reflux medium (from the kettle or as medium added to the column) as mixture having constant boiling point, together with possible minute traces of the dihydric alcohol component of the reaction mixture in the kettle 10, are drawn off from the upper portion 22 of the column through line 24, and are discharged into the upper portion of a separator chamber 26 and from the latter, are discharged upwardly through conduit 27 to a condenser chamber 28 having a vent 29 to a zone of appropriate pressure such as the atmosphere. The pressure could also be subatmospheric to promote removal of vapors, if so desired.

The vapors of water and solvent medium are condensed in the chamber and the condensed liquids are returned through conduit 27 to chamber 26, where they flow downward through opening 30 in partition 30a and conduit 30b to separator chamber or decanter 26a. In this chamber, the liquids stratify into layers having an interface X, which preferably is at about the terminus of conduit 30b. A baffle b slightly below the end of conduit 30b, deflects the liquids horizontally, and aids stratification of the liquid phases. In most instances, the water collects in the bottom of the chamber 26a, while the liquid solvent medium, being insoluble in and lighter than water, collects in the upper layer. These layers are drawn off respectively through lines 31 and 32, the former of which is provided with a vertical leg 36 of a height designed to maintain a proper level of water in the decanter chamber. Line 31 also vents to a zone at appropriate pressure, such as the atmosphere, or a vacuum through line 33, condenser 34 and line 29 as previously described.

Condensate (water) from line 31 may be returned through line 37 to line 21, in which case, it constitutes at least a part of the water used in washing the vapors in the top of the column 18. Likewise, solvent medium such as xylene, from the upper portions of the decanter 26a, passing out through line 32, may be returned in part or in toto through the same inlet line (21) to the top of the column.

It is important to observe that not all of either the water or the solvent medium need, at all times, be returned to the top of the column. Such part or parts as are required to assure a correct temperature (about 198° F. to about 210° F.) in the top of the column are essential. These vary during the course of the reaction dependent upon conditions in the reaction kettle. When the solvent medium or a part thereof are not required in the top of the column to maintain the temperature and the proportions of constant boiling, such part as is not required may be returned directly to the reaction zone. In any event, the medium ultimately returns to the kettle regardless of its path. For purposes of providing for direct return of medium a line 32a is provided having valve 32v by means of which the proportion returning to the kettle can be controlled. A branch 32b having valve $32v^1$ provides a path whereby some, or all of the solvent medium may also be routed to an intermediate zone of the column to provide a temperature control therein. By adjustment of the valves 32v and $32v^1$ the proportioning of the several parts of the system to obtain most efficient operation, may be secured.

The proportions of water and solvent medium returning to the top of the column 19 are accurately controlled and measured by means of suitable valves and meters, the latter of which may be so-called "Rotameters," shown but diagrammatically in the drawings. One of these 38, measures the flow of water while the other 39, measures the flow of reflux medium. The valve system comprises manually controlled valves 41 and 42 disposed in lines 32 and 37 respectively, below meters 39 and 38. These valves constitute means whereby the return flow of water and solvent can be shut off completely, if desired, or by which the rate of flow can be adjusted manually to meet operating conditions.

For purposes of illustration, the return lines 32 and 37 are also indicated as being provided with automatically operable control valves 43 and 44 which can be controlled thermostatically by conditions in the column 18 as for example, through a line 46 having branches as at 47 or 48 to the respective valves. The valves may be electrically or pneumatically operated and the lines 46, 47 and 48 may be electrical conductors, or they may be tubes designed for conducting actuating fluid for the valves. Control of the actuating current or fluid to the valves may be automatically attained by a thermocouple, or a bimetallic element disposed in a suitable well 49 in the column 18, and having a connection 51 with mechanism indicated at 52 which may combine the functions of recording the temperatures in the zone about the well in the column 18 and also of providing a relay for the fluid medium to the automatic valves 43 and 44. Since such valves and the controls thereof are well recognized pieces of apparatus, elaboration on their construction is not deemed necessary.

The well 49 may be disposed in substantially any desired position in the column 18 and by proper adjustment of the apparatus for a predetermined temperature, it can be made to control the flow of returning fluids to the top of the column to attain desired return to the kettle of substantially all of the dihydric alcohol component from the vapors in the upper portion 22 of the column. However, it has now been found, that for purposes of attaining maximum stability and ease of operation of the system, it is preferable to position the well in an intermediate portion of the column, for example, in or near the bottom of the upper third portion thereof. Departures from this precise position are permissible, but it is preferred that the well be within the middle three-fourths of the packed portion of the column. The well could also be inserted, at the top of the packing, the apparatus would, however, be more critical in its behavior. It will be manifest that the apparatus should be adjusted to maintain a predetermined temperature in the specific zone in the column in which the well 49 is inserted. This temperature can be so selected that when it is attained, the top of the column, at least during the early stages of the run, will be at, or near the preferred temperature, as for instance near, or slightly above the boiling point of a constant boiling mixture of water and xylene or other solvent. If the position in the column of the well is raised or lowered, adjustment must be made in order to reach the temperature normal to the zone, when the top of the column is at its proper temperature.

Any desired number of additional wells, such as top and bottom wells 53 and 53a, designed to maintain a close check on temperature conditions in the various portions of the column may be included in the apparatus. However, as shown in the drawings, the well 49 preferably constitutes the zone at which temperatures are determined for the control of the return flow of the liquids to the top of the column. It is to be understood that the connections between the recording and relay device 52 and the valves 43 and 44 constitute refinements and are optional. The device 52, if preferred, may constitute a mere recorder for the temperature in the zone of the well 49, in which case the valves 43 and 44, or 41 and 42, are adjusted manually by an operator after due observation of the temperatures recorded by the device 52.

It will be manifest that the amounts of reflux medium and water available for washing the vapors and controlling the temperature in the top zones of the column 18 are often subjected to substantial variation and this is especially true of the water of reaction, since the latter increases to a maximum as the rate of reaction of esterification in the kettle 10 rises as the temperature rises; but as the reaction nears completion, the amount of evolved water obviously decreases, ultimately nearly to the vanishing point. To compensate for these variations, reserve tanks 54 and 56 are provided respectively for the water and solvent medium. The tank 54 functions to collect a reserve supply of water condensate which is used over and over to cool the top of column 18. The tanks are connected by lines 57 and 58 respectively to return lines 37 and 32 so that flow of liquids may be either to, or from the tanks, dependent upon the requirements for cooling and washing liquids for the top of said column. It will be obvious that the flow of liquids in the lines 57 and 58 may be hydrostatic and is away from the tanks when the supply of solvent liquid from the separator or decanter 26 is insufficient. On the other hand, when the latter source of supply becomes more than adequate to meet the requirements of the column, liquids can back up and flow toward the tanks, where they can be stored until required. Valves 59 and 61 provided in the lines 57 and 58, constitute means whereby the flow of liquids to, or from the tanks may be stopped, or adjusted at will. The tanks are also provided with lines 62 and 63 having valves 64 and 66 by means of which the supply of liquids can be replenished, or in event that they become excessive, a portion thereof can be discharged from the tanks at will. Desired operating pressures (which are usually atmospheric, but may be sub-atmospheric or super-atmospheric) in the tops of the tanks may be maintained through lines 67 and 68, which are joined together and the latter of which is connected to vent line 33.

It will be observed that the column 18 is provided at its bottom with a return line 69 for the return to the reaction kettle 10 of xylene or other solvent medium, as well as condensed glycol or other dihydric alcohols from the column or of solvent medium from line 32a. U shaped bend 71 in the line 69 provides a liquid seal to prevent the upward passage of vapors through this line. The line is also provided with a valve 72 by means of which the flow of liquid can be stopped, if desired.

Since the packing in the column 18, at lower temperatures often offers considerable resistance to the flow of vapors and fixed gases like carbon dioxide, or combustion gases, it is preferable to provide the kettle with a blow-off system which can be used to bypass the gases from the column 18 at the conclusion of the reaction or at any other desired stage. Such blow-off system includes a line 73 having a valve 74 by means of which it can be opened or closed at will. Line 73 discharges into a condenser 76, by means of which vapors of liquids such as reflux medium or the like can be condensed out and passed through line 77 to a receiver 78 having a drainage line 79, with a valve 81. The condenser and the receiver are vented to the atmosphere or to other constant pressure zone, either sub-atmospheric, or super-atmospheric, by means of a line 82 having a condenser 83, designed to condense out and recover any valuable materials, such as residues of solvent medium or dihydric alcohol, which may be carried in the escaping gases.

In the operation of the apparatus illustrated in the drawings, it is customary to initiate the reaction while charges of water and reflux medium are in tanks 54 and 56, in order that there may be an abundance of these materials at all times, properly to cool the vapor mixture in the top of column 18 and to wash out any dihydric alcohol vapors in this zone.

The kettle 10 is provided with a charge suitable for the preparation of a polyester in accordance with the provisions of the present invention. This charge may comprise the common ingredients employed in polyesters, for example, of the type conventionally used in the preparation of polyurethane resins through reaction of said polyester with a diisocyanate, such as tolylene diisocyanate.

The use of the process and apparatus will now be illustrated by way of specific examples; in these examples, the non-ethylenic dicarboxylic acids are given by way of example. Others, such as are illustrated in Tables A and B could be used.

The polyol components also are by way of example and could be replaced by others, such as are illustrated in Table C.

The non-reactive solvent forming constant boiling mixtures with water may be other than the xylene employed for purposes of illustration.

The final polyester may be tailored to various acid values but usually the latter is about 1 to 3; various viscosities to meet specific requirements are contemplated.

*Example I*

This example illustrates the preparation of a non-ethylenic polyester, such as is used in the preparation of polyurethane resins by use of such apparatus as is herein illustrated. The reaction mixture comprises as its primary components:

| | Moles |
|---|---|
| Adipic acid | 4 |
| Diethylene glycol | 3 |
| Trimethylol ethane | 2.2 |

The excess of hydroxyls over carboxyls is 4.6 moles.

To this mixture is added solvent (xylene) adapted to form a constant boiling mixture with water, but not to form a ternary vapor mixture with water and diethylene glycol. The xylene is added in an amount of about 1 to 10 percent based upon the mixture since it does not react in the mixture and is recycled over and over during the course of the reaction, the amount need not be, great or exact, provided some is present in the reaction zone.

In the reaction mixture the trimethylol ethane is not a glycol or dihydric component. However, it does tend to sublime from the reaction mixture. It is found that the use of water in the top of the column effectively prevents loss of this triol as well as that of the diethylene glycol component.

The foregoing charge is introduced into the kettle 10 and then heated up to reaction temperature at which point the evolution of water is observed. In this example, water begins to come over at 320° F. to 329° F., but the temperature required to maintain the evolution of water gradually increases, as the reaction proceeds and for the particular mixture, usually reaches a maximum of about 430° F. in a period dependent upon the size of the batch. During the warm up time, considerable amounts of water are evolved and the better the heat transfer, in the kettle, the more rapid is the evolution of water. However, even then, some small amount of added water is usually required to maintain constant boiling temperature conditions in the top of the column.

If heat input in the kettle is high, it is often found that the xylene vaporized from the kettle is sufficient and that little or no xylene need be returned through line 32. Instead, it can be returned by more direct route through lines 32a and/or 32b to the kettle. Other apparatus having less efficient heat transfer may not evaporate enough xylene from the kettle and may require some xylene to the top of the column even in the early stages of reaction.

During this period of water evolution, the mid portion of the column is maintained at a temperature of about 220° F. to 230° F., at which temperature the maintenance of the desired temperature of constant boiling of the mixture in the top of the column is largely automatic, especially during the early stages when large amounts of water are being evolved in the kettle.

When the temperature in the top of the column starts to rise indicating a slowing up of the evolution of water and the absence of conditions to form a constant boiling mixture in that zone, a reflux of water or water and solvent xylene is initiated, the proportions being adjusted to give approximately constant boiling proportions of total water and xylene vapors from the column.

A mixture of water and commercial xylene has been found experimentally to boil quite close to 198° F. at 760 millimeters of atmospheric pressure and the vapor mixture at this temperature comprises about 34.7 percent by weight of water. Conditions in the top of the column are adjusted approximately to maintain this ratio in the off vapors. A mixture of water and xylene of these proportions will boil away at said constant boiling temperature. At this temperature vapors of water and xylene can be conducted out of the system with but very little loss of diol or polyol content. The vapors can be condensed and the water separated. The xylol can be returned to the system through column or directly to the kettle as required. The proportions of water in the mixture fed to the top of the column are usually in a ratio of about 1 to 4, at least during the later stages of the reaction when the evolution of water in the kettle has slowed up.

In general, it will be recognized that the off vapors of xylene and water must constitute the avenue of disposal of all of the water evolved in the kettle. Water and/or water and xylene are therefore returned in such amounts as concurrently approximately to maintain the correct temperature and to assure that all of the water reaching the top of the column will be carried out of the system, in the mixture of vapors comprising about 34.7 percent of water and 65.3 percent of xylene. Such xylene as is not used in maintaining the constant boiling mixture of water and xylene in the top of the column is by-passed back to kettle 10 through lines 32a and/or 32b.

Completion of the reaction is usually determined by routine control tests performed upon samples of the polyester product in the kettle. These comprise an acid value determination or a viscosity check. For example, with the foregoing mixture when the acid number is at minimum, acid number; e.g. usually 1 to 3, the reflux to the top of the column is discontinued and the kettle is sparged with inert gas; e.g. combustion gases to remove the solvent medium and traces of water and other volatiles and to increase the viscosity to desired value. The hydroxyl value will then be in the range of 40 to 250. Practically all molecular termini will be filled with hydroxyl (—OH) groups.

In the final stages of reaction to form polyester of the very low acid number above given, it is recognized that the glycol losses in a conventional system tend to be especially severe. The present invention, therefore, is particularly useful in connection with the preparation of these polyesters.

The polyester at correct acid value is cooled and may be mixed with diisocyanate, such as toluene diisocyanate in order to provide useful films and foams.

In the preparation of the polyesters, other acids and other glycols, as herein disclosed may be used; the triol is optional.

*Example II*

In Example I eliminate the triol, replacing the same with a molecularly equivalent amount of diethylene glycol. Use the same temperatures and criteria of reaction as in the former example.

*Example III*

Replace the adipic acid of Example I with phthalic acid and proceed as in the former example.

*Example IV*

Replace the adipic acid with a mixture of 2 moles of adipic acid and 2 moles of phthalic acid.

*Example V*

This example illustrates the preparation of a polyester suitable for use in forming flexible polyurethane foams. The proportions of the reactants are:

| | Moles |
|---|---|
| Adipic acid | 16 |
| Diethylene glycol | 17 |
| Trimethylol ethane | 1 |

The charge is heated in the kettle with about 5 to 10 percent of xylene to boil off water and xylene. Constant boiling temperature for the mixture of water and xylene, e.g., about 198° F. is maintained in the top of the column water and/or water and xylene being added to the top of the column to maintain the water vapor content of the off vapors approximately at 34.7 percent by weight. Cooking is continued until the acid number is about 1 to 3, in which instance practically all polyester molecules terminate with hydroxyls. The product is blown to desired viscosity.

*Example VI*

Replace xylene in Example I with toluene and boil the charge to obtain esterification. Water is added at the top of the column to maintain the temperature of constant boiling, which has been determined experimentally to be about 184° F. The composition of the water-toluene vapors from the top of the colmn is approximately 19.7 percent water and 80.3 percent of toluene.

The water-toluene vapors are condensed, the water separates and such amount thereof as is required to maintain correct temperature and water ratio in the off vapors is returned to the column. The toluene is returned either through the column or directly to the kettle, dependent upon requirements in the column in concurrently maintaining said temperature of 184° F. in the top of the column and in making certain that all of the evolved water is carried out of the system.

*Example VII*

The esterifiable mixture in this example corresponds to that of Example I. However, the solvent employed is benzene. This forms a constant boiling mixture with water at a temperature of about 157° F., at which temperature the composition of the vapor mixture is approximately 9 percent by weight of water and 91 percent by weight of benzene.

Water and benzene are therefore added to the top of the column in such amounts as to approximately maintain the temperature of boiling of this mixture, while concurrently eliminating all of the water of reaction from the system in the off vapor mixture.

We claim:

1. A method of forming a polyester of a dihydric alcohol component and a dicarboxylic acid component, each consisting solely of atoms of carbon, hydrogen and oxygen, the dihydric alcohol component containing about 2 to 10 carbon atoms per molecule and boiling in a range below about 280° C., the dicarboxylic acid component being free of plural carbon to carbon bonds other than benzenoid double bonds; which method comprises heating an esterification mixture of said alcohol and said acid in a nonreactive liquid aromatic hydrocarbon solvent for the mixture, said solvent being adapted to form a constant boiling mixture with water and not forming ternary vapor mixtures with water and said alcohol, and being substantially immiscible with water, heating of the esterification mixture being at a temperature to effect esterification and to evolve water of esterification, but above that of boiling of the solvent and below 536° F., passing the vapors from the reaction upwardly through a vapor zone at a temperature above about 212° F. and below the temperature of heating of the mixture, adding cooling water to the top of the zone to strip out vapors of dihydric alcohol therefrom, the top of the zone being maintained at a temperature above that of boiling of the mixture of water and solvent and between about 157° F. and about 210° F., and drawing therefrom a mixture of vapors from said solvent and water in substantially constant boiling ratio, heating of the esterification mixture being continued until a polyester having a hydroxyl value in a range between 50 and about 500 is obtained.

2. A method of forming a polyester of a dihydric alcohol containing 2 to about 10 carbon atoms and boiling in a range below about 280° C., and a dicarboxylic acid component which is free of plural carbon to carbon bonds other than benzenoid double bonds, said dicarboxylic acid component being selected from the class consisting of phthalic acid, terephthalic acid, isophthalic acid, oxalic acid, glutaric acid, adipic acid, azelaic acid, sebacic acid, malonic acid, succinic acid, isosebacic acid, suberic acid and decanedioic acid, the dihydric alcohol being in substantial excess of equivalency with respect to the dicarboxylic acid component; which method comprises heating a mixture comprising said alcohol, said acid and xylene in an esterification zone at a temperature to effect esterification and to evolve water of esterification, and being above that of boiling of the xylene and below about 536° F., passing the vapors from the reaction upwardly through a vapor zone maintained at a temperature in a range of about 215° F. to about 280° F. to prevent return of water to the esterification zone, adding water to the top of the zone to maintain the temperature thereof in a range of about 198° F. to about 210° F. whereby to strip out vapors of dihydric alcohol therefrom, and drawing from said top of the vapor zone a mixture of vapors of said solvent and water substantially in constant boiling ratio, heating being continued until a polyester having a hydroxyl value in a range between about 50 and about 500 is obtained.

3. A method of forming a polyester of a dihydric alcohol component containing 2 to about 10 carbon atoms and consisting solely of carbon, hydrogen and oxygen, and boiling in a range below about 280° C., and a dicarboxylic acid component which is free of plural carbon to carbon bonds other than benzenoid double bonds, said dicarboxylic acid being selected from the class consisting of phthalic acid, terephthalic acid, isophthalic acid, oxalic acid, glutaric acid, adipic acid, azelaic acid, sebacic acid, malonic acid, succinic acid, isosebacic acid, suberic acid and decanedioic acid; which method comprises heating a mixture of said alcohol, said acid and xylene in an esterification zone at a temperature to split off water and to effect esterification, but below about 536° F., passing the vapors from the reaction upwardly through a vapor zone maintained at a temperature of about 215° F. to about 280° F., adding cooling water to the top of the vapor zone to maintain the temperature thereof in a range of about 198° F. to about 210° F., and drawing from the top of the vapor zone a constant boiling mixture of vapors of said solvent and water, and returning dihydric alcohol condensed from said top of the vapor zone to the reaction mixture, the mixture of vapors from the top of the vapor zone being condensed and separated into a water phase and a solvent phase, and water from the water phase being returned to the top of the column as cooling water, the temperature of esterification being maintained in the esterification zone until a polyester is formed having substantially all termini of the polyester molecule hydroxylated and having a hydroxyl value in a range of about 50 to amout 500.

4. A method of forming a polyester of a dihydric alcohol component containing 2 to about 10 carbon atoms and boiling in a range below about 280° C., and a dicarboxylic acid component which is free of plural carbon to carbon bonds other than benzenoid double bonds, said dihydric alcohol and said dicarboxylic acid each consisting solely of atoms of carbon, hydrogen and oxygen; which method comprises heating a mixture of said alcohol and said acid in xylene in an esterification zone at a temperature adapted to split off water and to effect esterification, but being below about 536° F., passing the vapors from the reaction upwardly through a vapor zone having a lower portion maintained at a temperature of about 215° F. to about 280° F., adding cooling water to the top of the vapor zone to maintain the temperature thereof in a range of about 198° F. to about 210° F., and drawing from the top of the vapor zone a constant boiling mixture of vapors of said solvent and water, and returning dihydric alcohol from said top of the vapor zone to the reaction mixture, the temperature of esterification being maintained until a polyester is formed and the hydroxyl value of the polyester attains the range of about 50 to about 500, xylene being returned to the reaction zone through the top of the zone to which water is added.

References Cited in the file of this patent

UNITED STATES PATENTS 2,279,764     Smith et al. _____ Apr. 14, 1942

FOREIGN PATENTS 462,511     Great Britain _____ Mar. 10, 1937

OTHER REFERENCES

Groggins, Unit Processes in Organic Synthesis, 4th ed., page 636, McGraw-Hill Book Co., Inc., N.Y., 1952.

UNITED STATES PATENT OFFICE
CERTIFICATE OF CORRECTION

Patent No. 2,993,029                                  July 18, 1961

Carl C. Georgian et al.

It is hereby certified that error appears in the above numbered patent requiring correction and that the said Letters Patent should read as corrected below.

Column 10, line 4, for "347" read -- 34.7 --; column 12, line 38, for "amout" read -- about --.

Signed and sealed this 10th day of July 1962.

(SEAL)
Attest:

ERNEST W. SWIDER                              DAVID L. LADD
Attesting Officer                                 Commissioner of Patents